US008611910B2

(12) United States Patent  (10) Patent No.: US 8,611,910 B2
Christensen et al.  (45) Date of Patent: Dec. 17, 2013

(54) METHOD AND SYSTEM FOR FORMING AN ACTIONABLE COMMUNICATION RESOURCE

(75) Inventors: Laura A. Christensen, Arlington Heights, IL (US); Arthur L. Fumarolo, Schaumburg, IL (US); Matthew C. Keller, Barrington, IL (US); Deborah J. Monks, Palatine, IL (US); Brian R. Poe, Cary, IL (US); Tyrone D. Bekiares, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 88 days.

(21) Appl. No.: 12/966,652

(22) Filed: Dec. 13, 2010

(65) Prior Publication Data

US 2012/0115494 A1  May 10, 2012

Related U.S. Application Data

(60) Provisional application No. 61/410,895, filed on Nov. 6, 2010.

(51) Int. Cl.
*H04W 72/00* (2009.01)

(52) U.S. Cl.
USPC ........... 455/450; 455/517; 455/519; 455/520; 455/521; 340/825.03

(58) Field of Classification Search
USPC .............. 455/450, 517, 519–521; 340/825.03
See application file for complete search history.

(56) References Cited

U.S. PATENT DOCUMENTS

| 5,371,492 A | 12/1994 | Lohrbach et al. |
| 5,371,900 A | 12/1994 | Bar-On et al. |
| 5,689,810 A * | 11/1997 | Shaughnessy et al. ....... 455/517 |
| 6,477,387 B1 * | 11/2002 | Jackson et al. ................ 455/519 |
| 2010/0159976 A1 | 6/2010 | Marocchi et al. |

FOREIGN PATENT DOCUMENTS

| WO | 9612376 A1 | 4/1996 |
| WO | 0128276 A1 | 4/2001 |
| WO | 2006011770 A1 | 2/2006 |
| WO | 2008032043 A1 | 3/2008 |

OTHER PUBLICATIONS

PCT International Search Report Dated Jan. 25, 2012.

* cited by examiner

*Primary Examiner* — Charles Shedrick
(74) *Attorney, Agent, or Firm* — Valerie M. Davis; Kenneth A. Haas

(57) ABSTRACT

An actionable communication resource forming function performs a method for forming an actionable communication resource in a communication system. The method includes receiving, from a resource management system, a plurality of resource identifiers that identify a plurality of resources, wherein each resource is associated with a communication device addressable by a communication system using a communication device identifier; for each resource identifier, determining the communication device identifier for the associated communication device; for each communication device identifier, identifying a communication group to which the corresponding communication device is affiliated, and using the identified communication groups to determine a set of communication groups, wherein each communication group in the set is addressable by the communication system, wherein an actionable communication resource is formed from the set of communication groups to facilitate communications with the communication devices over the communication system using the addressable communication groups.

20 Claims, 2 Drawing Sheets

METHOD AND SYSTEM FOR FORMING AN ACTIONABLE COMMUNICATION RESOURCE

TECHNICAL FIELD

The technical field relates generally to communication systems and more particularly to forming an actionable communication resource to facilitate communications with communication devices that are associated with resources assigned by a resource management system.

BACKGROUND

A resource management system, such as a Computer Aided Dispatch (CAD) system, can be used to assign resources in response to an incident, event, or occurrence. Such resources can include agencies, responder units, vehicles, and responders themselves, for example. The resources have one or more communication devices associated therewith that are addressable by a separate communication system (such as a two-way land mobile radio system) to which the communication devices are connected. During the course of the incident, a CAD operator may wish to communicate with all or as many of the assigned responders as possible via their communication devices. Such communications can be facilitated using communication methods including, but not limited to, radio console mechanisms such as Instant Transmit, All Points Bulletin (APB) Transmit, Conference Bridge, Communication Bridge, Audio Bridge, Console Patch, Communication Channel Patch, Communication Group Patch, and the like.

However, known techniques for communicating with the responders assigned to an incident involve a number of manual operations on the part of the CAD dispatch operator, which are cumbersome at best and inaccurate at worst. More particularly, the CAD dispatch operators work on the level of dispatch units and lists of responders addressable by the CAD system. The dispatch operators also communicate with those same responders through the separate radio system, which uses different responder identities, communication group identities and voice enabled device identities.

In addition, the communication groups to which the communication devices (used by responders) are affiliated can change for example depending on whether the responders are on duty or off duty, or based on their current task, assignment or role, what incident they are assigned to, etc. Thus, the dispatch operator today is not always aware of which communication groups each responder is affiliated with, especially in cases of medium to large incidents, requiring restructuring of the communication groups and requiring mutual aid resources from outside agencies, and especially since there is no one-to-one mapping between the CAD resource lists and the responders' communication groups. There is, therefore, no easy way to communicate with all of the responders assigned to the incident. Moreover, the assigned resources and associated communication devices and communication groups may dynamically change during the incident making a manual process that much more difficult.

Thus, there exists a need for a method and system for forming an actionable communication resource to facilitate communications with communication devices that are associated with resources assigned by a resource management system, wherein the method minimizes manual activity by an operator of the resource management system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
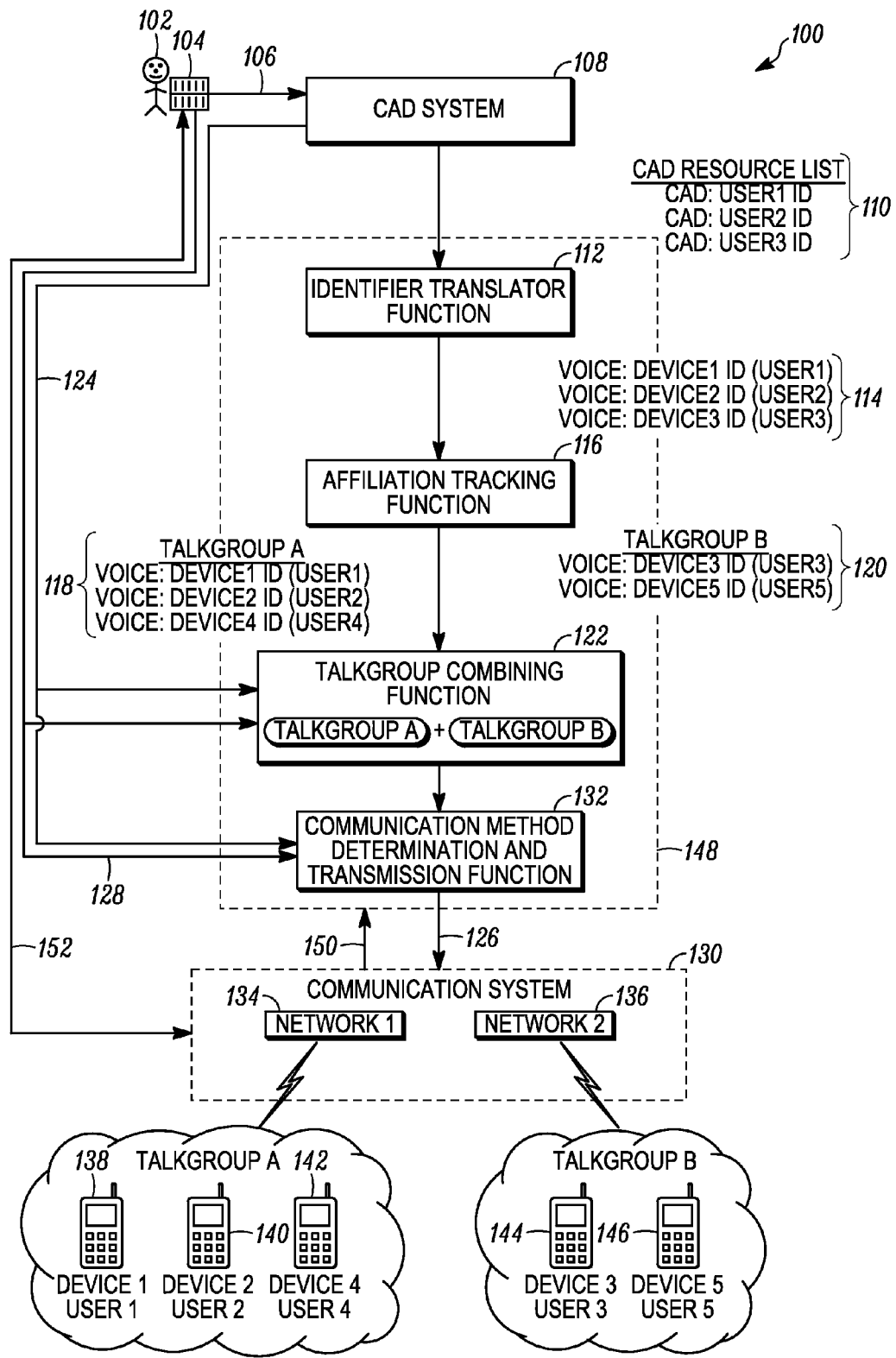
FIG. 1 is a block diagram illustrating a system that implements the forming and using of an actionable communication resource in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, an actionable communication resource forming function performs a method for forming an actionable communication resource in a communication system. The method includes receiving, from a resource management system, a plurality of resource identifiers that identify a plurality of resources, wherein each resource is associated with a communication device addressable by a communication system using a communication device identifier; for each resource identifier, determining the communication device identifier for the associated communication device; for each communication device identifier, identifying a communication group to which the corresponding communication device is affiliated, and using the identified communication groups to determine a set of communication groups, wherein each communication group in the set is addressable by the communication system, wherein an actionable communication resource is formed from the set of communication groups to facilitate communications with the communication devices over the communication system using the addressable communication groups. The actionable communication resource can be used by an operator of the resource management system to communicate with the communication devices (associated with the assigned resources) over the communication system using the addressable communication groups.

An illustrative advantage of the present teachings is the provision of a more straightforward and streamlined mechanism for an operator of a resource management system (such as a CAD dispatch operator) to initiate communications to all resources (e.g., agencies, units, responders, etc.) that are assigned to the same incident or event. This mechanism minimizes manual operations, by the operator of the resource management system, to identify the communication groups used to form the actionable communication resource, which is used by the operator to communicate with those assigned resources. In addition, dynamic changes during the incident to the assigned resources and to the communication groups associated with those assigned resources, for instance, are better managed using the present teachings than when using the known techniques. Those skilled in the art will realize that the above recognized advantages and other advantages described herein are merely illustrative and are not meant to be a complete rendering of all of the advantages of the various embodiments.

Referring now to the drawings, and in particular FIG. 1, a block diagram of a system that implements the forming and using of an actionable communication resource in accordance with some embodiments is shown and indicated generally at 100. System 100 illustrates a CAD system and a voice communication system. However, those skilled in the art will recognize and appreciate that the specifics of this example are merely illustrative of some embodiments and that the teachings set forth herein are applicable in a variety of alternative settings. For example, the teachings described do not depend on the type of resource management system or the type of communication network. As such, other alternative implementations using different types of resource management systems and communication networks are contemplated and are within the scope of the various teachings described.

System 100 includes a resource management system 108 (which in this case is a CAD system), an actionable communication resource forming function 148 (which includes an identifier translator function 112, an affiliation tracking function 116, a talkgroup combining function 122, and a communication method determination and transmission function 132), a communication system 130 (which includes a network 1 (134) and a network 2 (136)), and communication devices 138, 140, 142, 144, and 146. In general, these elements of system 100 are implemented using one or more (although not shown) memory devices, interfaces, and processing devices that are operatively coupled, and which when programmed form the means for these system elements to implement their desired functionality, for example, as illustrated by reference to the method shown in FIG. 2.

The interfaces are used for passing information, for example, in the form of resource lists, device identifiers, and signaling or messaging (e.g., packets, datagrams, frames, superframes, or any other information blocks) having media or control between the elements of the system 100. The implementation of the interface in any particular element depends on whether that element is connected to another element in the system or connected to a communication network (e.g., networks 134 and 136). For example, the interfaces between two elements within system 100 (such as between the CAD system 108 and the communication system 130) can include one or more wired interfaces such as a serial port interface (e.g., compliant with the RS-232 standard), a parallel port interface, an Ethernet interface, a USB interface, and/or a FireWire interface, and the like. Interfaces between functional blocks such as blocks 112 and 116 can be internal interfaces if these functional elements are included within the same device.

Where the interfaces support wireless communications (such as between the communication devices 138-146 and the networks 134 and 136), the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the elements of system 100 may be programmed with software or firmware logic or code for performing functionality described by reference to FIG. 2; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a brief description of each of the system elements shown in FIG. 1, which will aid in the understanding of the later description of the method illustrated in FIG. 2. The present illustrative implementation of system 100 includes the CAD system 108, which is operated by and receives input 106 from a dispatch operator 102 through a user interface 104 commonly referred to as a CAD workstation or CAD terminal In an embodiment, the user interface 104 further comprises a communication (e.g., voice) console that couples to the communication system 130 through a wired interface, and the CAD terminal and voice console are coupled using a wired interface and communicate using a console application programming interface. The CAD system 108 uses software, access to various servers, and the input 106 from the dispatch operator 102 to generate and provide a set or list 110 containing a plurality of resource identifiers. The resource identifiers identify a plurality of resources (e.g., agencies, units, responders, devices, etc.), which in this case were selected for responding to a reported incident or event such as a fire, hazardous chemical spill, etc. However, system 100 is not limited to including a CAD system. Alternatively, embodiments of the resource management system could include, but are not limited to, a work order management system, a customer service system, or any other system that manages resources and outputs a list of resource identifiers that are, ultimately, used to form and use an actionable communication resource, in accordance with the teachings herein.

The list 110 of resource identifiers is provided to the actionable communication resource forming function 148 to identify a set of communication groups, e.g., 118 and 120, to which communication devices, e.g., 114, (associated with selected resources 110) are affiliated. The term affiliated as used herein is defined as being associated as a member of a communication group, thereby, having permission or access to receive and listen to communications or media provided to or between the members of the communication group. In this case, the communication groups comprise talkgroups (e.g., talkgroups A and B), which can be identified by talkgroup identifiers. However, the communication groups can have any "group" structure that is addressable and identifiable by the communication system 130 including, but not limited to, communication channels such as conventional analog or digital channels, etc. As used herein, a talkgroup is defined as a communication group for voice communications, and a communication channel is defined as a medium over which media is transmitted between members of a communication group.

Function 148 comprises multiple logical functions 112, 116, 122, and 132 which perform functionality that is explained in detail below by reference to FIG. 2. The particular device or devices (if the functionality is distributed between multiple devices) in which the logical functions 112, 116, 122, and 132 are housed depends on the particular system 100 architecture implementation. In some illustrative implementations, all or some of the functionality of logical functions 112, 116, 122, and 132 is performed in the CAD system 108, in the voice console, in the communication system 130, in a stand alone infrastructure device (e.g., a subsystem or controller), or some combination of these devices.

The communication system 130 receives an indication 126 (e.g., via communication group identifiers) of the set of communication groups 118, 120 and an indication 126 (e.g., some sort of signal or data) of the actionable communication resource that was formed by the communication method determination and transmission function 132. The communication system 130 then enables, through one or more networks, communications between the CAD dispatch operator 102 and the communication devices 114 and/or communications amongst the devices 114 themselves, which are associated with or used by or included within the resources that were dispatched using the CAD system 108.

In the illustrative system 100 implementation, the communication system 130 comprises a voice communication system such as a push-to-talk (PTT) dispatch radio system (not shown) (which can be carrier-based PTT, broadband-based PTT, two-way land mobile radio based PTT, etc.), which receives the indications 126 of the set of identified communication groups and of the actionable communication resource. The actionable communication resource can take any suitable form to enable the operator 102 to communicate with the devices 114 (associated with the assigned resources 110) and/or to enable communication amongst the devices 114 including, a multiselect (MSEL) group, a Conference Bridge, a Communication Bridge, an Audio Bridge, a Console Patch, a Communication Channel Patch, a Communication Group Patch, and the like, for audio distribution via appropriate wireless networks to the identified communication groups that contain the communication devices 114.

As used herein, the terms bridge and patch mean a relationship between communication groups which allows members of those distinct groups to communicate with each other. Think of joining groups A & B so that all the members in A and B can now communicate with each other, when they could not previously. The term MSEL group means an action by which a dispatcher simultaneously selects multiple communication groups so she can monitor them together, and transmit to them together. Note that MSEL allows these joint operations to the dispatcher, but does not allow the members of the communication groups to communicate with each other (as is provided by Patch). Moreover, although voice distribution is illustrated, the present teachings can be used to form an actionable communication resource to distribute other media types such as video, etc.

The wireless networks 134, 136 include infrastructure devices such as base stations, base station controllers (not shown), and the like, depending on the network implementation. Moreover, the networks can be configured as a 2G, 3G, or 4G network using communication technologies including, but not limited to, Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Single Carrier Frequency Division Multiple Access (SC-FDMA), Discrete Fourier Transform-Spread Orthogonal Frequency Division Multiplexing (DFT-SOFDM), Interleaved Frequency-Division Multiple Access (IFDMA), Worldwide Interoperability for Microwave Access (WiMax), Long-Term Evolution (LTE). These wireless communication technologies enable the utilization of applications including, PTT, PTT over Cellular (PoC), Push-to-X (PTX, i.e., for communicating voice and/or other media such as images or video), Project 25, TETRA, and other communication technologies. Moreover, only two networks 134 and 136 are shown for ease of illustration. However, communication system 130 can include any number (N) and type of networks to support the desired communication methods and desired media transmissions within system 100.

The communication devices 138-146 are also referred to in the art as subscribers, user equipment, access devices, access terminals, mobile stations, mobile subscriber units, mobile devices, user devices, and the like. These communication devices can be any type of communication device such as radios, mobile phones, mobile data terminals, Personal Digital Assistants (PDAs), laptops, two-way radios, cell phones, and any other device capable of operating in a wired or wireless environment and that can be used by public users (such as consumers) or private users (such as public safety users).

Figure 2:
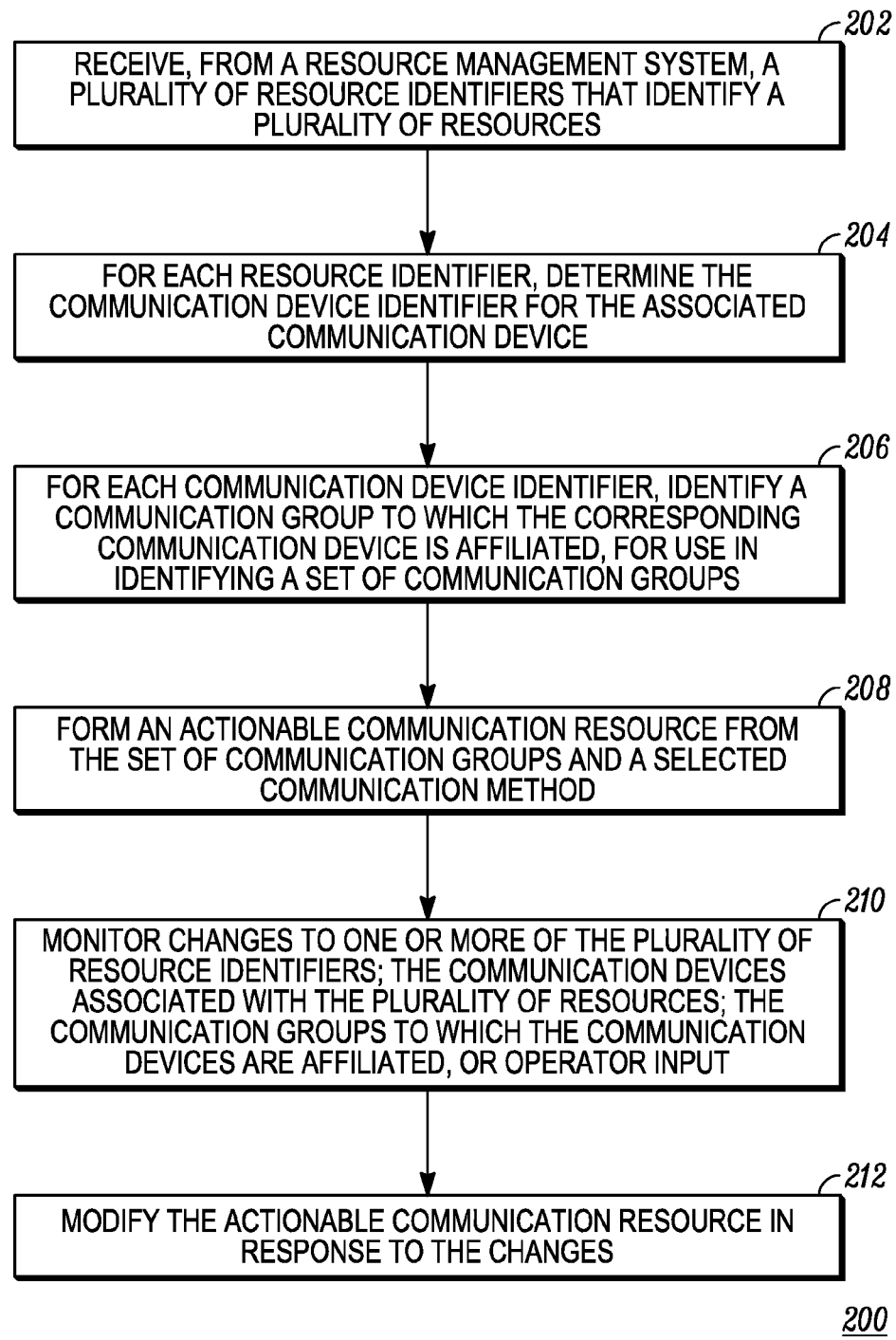
FIG. 2 is a flow diagram illustrating a method for forming an actionable communication resource in accordance with some embodiments.

Turning now to FIG. 2, a flow diagram illustrating a method for forming an actionable communication resource in accordance with some embodiments is shown and generally indicated at 200. Functionality shown in method 200 can be performed in elements of system 100 including the actionable communication resource forming function 148, the CAD system 108, and the communication system 130. More particularly, at 202, the identifier translator function 112 receives, from the resource management function (the CAD system) 108, a plurality of resource identifiers that identify a plurality of resources, wherein each resource is associated with at least one communication device addressable by the communication system 130 using a communication device identifier; and the identifier translator function 112 determines, 204, (for each resource identifier) the identifier for the associated communication device.

The manner in which the identifier translator function 112 performs its functionality depends on the resource identifiers supplied by the CAD system 108. As illustrated in FIG. 1, the CAD system 108 provides to the identifier translator function 112 a list 110 of CAD identifiers for users or responders (e.g., responder or user IDs for a USER1, a USER2, and a USER3) associated with resources selected for the incident; and function 112 determines the communication device IDs 114 (e.g., of a voice-enabled DEVICE1 for USER1, a voice-enabled DEVICE2 for USER2, and a voice-enabled DEVICE3 for USER3) for the communication devices used by these responders. Following is an example of how the CAD system 108 generates the CAD resource list 110, and how function 112 translates that list to the list of communication device IDs "associated" with the assigned resources. "Associated" in this context means that the communication devices are used by responders called or dispatched to the incident, and "associated" in a more general sense means that the communication devices are designated for use by the resources assigned by the resource management system.

In general, when an incident is reported, for example via a 911 call, information about the incident is provided to the CAD system 108. The CAD system applies algorithms that use this information to recommend which resources (e.g., agencies, units, responders, equipment, devices, etc.) to assign to the incident. These algorithms are based on emergency response plans (which are, for instance, based on type of incident) mutual aid agreements, responder types/roles required at the incident, availability of responders, availability of devices and equipment that are used by those responders, location and distance to the incident, etc. In one implementation scenario, the CAD dispatch operator 102 reviews the CAD recommendations and selects which resources to assign to the incident. The dispatch operator 102 can automatically accept the CAD recommendations, or may decide to select a subset, superset or different set of resources to assign to the incident.

More particularly, in one illustrative implementation, the CAD system 108 provides to the dispatch operator 102 a window, pertaining to the incident, on her CAD workstation 104. Within that Incident window is a Resources window where the CAD system 108 provides its recommended list of resources to assign to the incident. At first, the Resources window lists an initial set of resources that CAD recommends to assign to the new incident; and at a later time (as described in more detail below), the Resources window shows CAD recommendations for an additional set of resources to add to the ongoing incident (for example when the incident grows from a 3 alarm to 4 alarm fire). The dispatch operator 102 reviews the recommended list of resources (initial resources or additional resources), and may elect, using the CAD workstation 104, to follow the CAD recommended list of resources, may select a subset or superset of resources based on the CAD recommendations, or may select additional or different resources from an available pool of resources.

In one example embodiment, once the resources for the incident are assigned, the CAD system 108 determines the underlying responders associated with each resource. For each responder, function 148 determines (204), in this case, the one or more voice enabled devices (e.g., radios, broadband devices, etc.) used by that responder and further determines (206) communication groups that are currently affiliated with each of the responders' voice enabled devices. For instance, determining the communication groups to which the voice enabled devices are affiliated comprises determining a talkgroup or a communication channel, such as a conventional voice channel, to which the voice enabled devices are affiliated. In this manner, the function 148 determines all of the communication groups associated with each of the resources selected by the dispatch operator 102.

Providing a more detailed implementation for illustrative purposes, once the resources for the incident are assigned, the CAD system 108 determines, at least, a list of underlying responders for each selected resource. For example, the list of resources is determined based on the type of resource selected. For an agency, a list may be generated of all of the responders that are on duty within that particular agency. For a unit within an agency, a list may be generated of all of the responders and equipment associated with that particular unit. In addition, the CAD system 108 might determine the underlying responders associated with a special task force or with a particular role or set of roles or expertise needed for the emergency response, etc. Moreover, the list of responders may depend on user logon information to the CAD System 108, device capability information, date, time and shift assignment, presence or status information such as availability, location or proximity to the incident, etc.

The CAD system 108 provides this list of responders, for instance, in the form of CAD identifiers 110 for the responders (e.g., the USER1 ID, the USER2 ID, and the USER3 ID, as shown in FIG. 1) to the identifier translator function 112 to determine (204) for each responder identifier the communication device identifier for each associated communication device. There are a variety of methods that can be used by the identifier translator function 112 to determine responder association with at least one communication device including, but not limited to, a responder logging in through the device, a finger print swipe, a bar code swipe device, provisioning or configuring user-device association, input (150) from the communication system 130 to which the communication devices are connected, etc. Using one or more of these methods, the identifier translator function 112 determines the list 114 of identifiers corresponding to the communication devices (e.g., the DEVICE1 ID (for USER1), DEVICE2 ID (for USER2), and DEVICE3 ID (for USER3), as shown in FIG. 2), and provides this list to the affiliation tracking function 116. The communication device identifiers are known to the communication system 130 and used to identify or address the communication devices for the assigned responders.

The affiliation tracking function 116 identifies (206) the communication groups to which each device in the list 114 is affiliated. There are a variety of techniques that can be used by the affiliation tracking function 116 to identify the at least one communication group for each responder's device(s). An example technique comprises a communication device reporting to function 148 via the CAD system 108 or via the communication system 130 (e.g., using messaging 150) which communication groups are being monitored by that device. Such reporting can be done: upon power up; upon roaming into or out of the communication system 130; upon roaming between networks within the communication system 130; or at the time of communication group (e.g., talkgroup) affiliation.

Moreover, a mapping of device to communication groups can be a registration-based or presence-based solution that conveys device affiliation with communication groups or device selection setting or mode setting, wherein selection setting or mode setting is mapped to one or more communication groups. The communication device to communication group translation or mapping can be pre-configured, static, or dynamically changed. In addition, the one or more communication groups can be configured into the affiliation and tracking function 116 for each communication device a priori (i.e., ahead of time), and changed in real-time through automatic or manual methods. Furthermore, the CAD system 108 can use pre-configured communication groups to override a current setting on a communication device, perhaps in anticipation that the device will be either manually or automatically switched to monitor one or more pre-configured communication groups en route to the incident or upon arrival. Any combination of the above-described and other techniques can be used by the affiliation tracking function 116 to determine the one or more communication groups associated with each communication device identifier provided by the identifier translation function 112.

As illustrated in FIG. 1, the affiliation tracking function 116 identifies talkgroups A and B to which the communication devices in list 114 are affiliated. The communication devices having the DEVICE1 ID and the DEVICE2 ID are affiliated with talkgroup A (along with a communication device (for a USER4) having a DEVICE4 ID). The communication device having the DEVICE3 ID is affiliated with talkgroup B (along with a communication device (for a USER5) having a DEVICE5 ID). The affiliation tracking function provides an indication (e.g., talkgroup identifiers, lists of talkgroup members, etc.) to the talkgroup combining function 122, which uses any suitable algorithm to combine the identified communication groups to generate a set (e.g., 118, 120) of communication groups having members to which the dispatch operator 102 will communicate, and this algorithm can be based on, among other factors, the dispatch operator's selected communication method. Each communication group in the set is also identifiable by the communication system 130, for example by communication group identifiers (e.g., talkgroup or communication channel identifiers).

In a simple embodiment, as illustrated in FIG. 1, the talkgroup combining function 122 simply includes in the set of communication groups 118, 120 all of the communication groups identified by the affiliation tracking function 116. In a further implementation, the communication group combining function 122 might also combine the identified communication groups with one or more additional communication groups, for example based on policy, to the generate the set of communication groups. Likewise, the communication group combining function 122 might exclude one or more of the identified communication groups from the set, based on policy. For example, the communication group combining function 122 may include one or more additional Tactical communication groups, or select from a pool of available Tactical communication groups and assign one or more of those Tactical groups to the incident. The communication group combining function 122 might also remove or exclude certain communication groups, for instance, to prevent certain day-to-day communication groups from being pulled into the incident group. As stated above, function 122 can use any suitable algorithm for combining or otherwise using the identified communication groups to generate or form the set of communication groups.

Function 122 provides the set of communication groups 118, 120 (e.g., in the form of communication group identifiers) to the communication method determination and transmission function 132 to generate, form (208), or add to an existing actionable communication resource to facilitate communications with the communication devices 114 (associated with the selected resources) over the communication system 130 using the addressable communication groups. More particularly, the actionable communication resource is defined as a logical function used to inform or direct a communication system of a selected communication method to be used to facilitate media communications between the operator of the resource management system and the communication devices and/or between the communication devices themselves within the set of identified and selected communication groups, which was supplied by the talkgroup combining function 122.

In this case, the actionable communication resource is used by the CAD operator 102 to communicate with the assigned responders' communication devices 114 using the addressable talkgroups A and B. Accordingly, an additional input into the communication method determination and transmission function 122 is a selected communication method. The selected communication method is provided by the CAD system 108 (via messaging 124) or is provided directly from the CAD operator (via messaging 128 from the CAD workstation 104). More particularly, just as the dispatch operator 102 controls which resources he wants to select for the incident, in a further example implementation the dispatch operator 102 can also control the manner in which he communicates with these resources or the manner of communication between the resources, by selecting a desired communication method.

For example, within the same Incident window (as mentioned above) is a list of communication methods, which can be a complete list of communication methods or a subset of communications methods that pertain to that particular type of incident. Moreover, the list is controllable by agency or dispatch policy, etc. The dispatch operator 102 can choose a communication method from the list, and the indication of this choice and a transmit indication is provided (128) to the communication method determination and transmission function 132 to, in this case for instance, initiate a voice communication to and/or between the set of communication groups 118, 120 using the selected communication method.

In one illustrative implementation, the dispatch operator 102 selects High Priority Transmission with talkback (i.e., Instant Transmit), or High Priority Transmission Out Only (i.e., APB Transmit), or General Transmit with preceding Alert Tones (i.e., ALERT Transmit), or builds a new or reuses an existing bridge or Patch Group and transmits on that bridge or Patch Group (i.e., Patch Transmit). The dispatch operator 102 may further select a Conference Bridge, a Communication Bridge, an Audio Bridge, a Console Patch, an MSEL group, a Communication Channel Patch, a Communication Group Patch, etc.

In addition, The dispatch operator may also select a duration for the communication, for example: temporary (e.g., one time use only) or persistent (e.g., setting up communications immediately and lasting, for instance, until a specific event occurs, a period of time elapses, an operator tears it down, etc.). These alternative communication method selections can be provided as a list of choices requiring only a single selection, multiple selections, or additive selections by the dispatch operator 102, or can be configured a priori. Also, once there is at least one resource in the CAD System's list of assigned resources for a given Incident, then each time the dispatch operator 102 accesses the Incident window he could be offered a selection for "all resources currently assigned to incident". This is offered so the dispatch operator can, at any time, initiate a communication method to all resources assigned to the incident.

Instead of the CAD dispatch operator 102 directly selecting the communication method and providing the indication 128 of the selected communication method to the communication method determination and transmission function 132, the CAD dispatch operator 102, alternatively, selects (via the CAD workstation 104) one or more underlying attributes for the communication method. Then the CAD system 108 derives the actual communication method and provides an indication 124 of the selected communication method to the communication method determination and transmission function 132.

For example, the CAD dispatch operator 102 selects the type of duration of the communication, e.g., temporary or persistent. The CAD dispatch operator 102 further selects a type of floor control desired, e.g., transmit out only, transmit out and listen, patch transmit and conference rules, etc. In addition, the CAD dispatch operator 102 selects a transmission priority, e.g., High, Medium, Low, etc., in case there are multiple dispatch operators competing for the same communication groups. Moreover, the attributes from which to choose may include, but are not limited to, type or location of incident, agency or dispatch policy, or may be a combination of any of these and other attributes. The CAD system 108 translates the selected options into a specific communication method using pre-configured translation rules or an algorithm to derive the communication method, etc., and communicates 124 the selection to the communication method determination and transmission function 132.

Under the control or direction 126 of the actionable communication resource that is formed by the communication method determination and transmission function 132, the communication system 130 performs the selected communication method for the selected set of communication groups. As mentioned above, this may involve setting up an MSEL group and performing an APB or General Transmit, or setting up a Patch Group and Performing a Patch Transmit (for example, through the Voice Console API), which enables the dispatch operator 102 to communicate to all of the responders' communication devices that are assigned to the same incident.

More particularly with respect to the present illustrative implementation, when the CAD dispatch operator 102 speaks or otherwise transmits audio or voice to the communication system 130, the media is distributed to the communication groups A and B to which the communication devices 114 (of the assigned responders 110) are affiliated. As shown, the dispatch operator communicates to talkgroup A (having as members DEVICE1 138 for responder USER1 and DEVICE2 140 for responder USER2) over the network 1 (134) and communicates to talkgroup B (having as a member DEVICE3 144 for assigned responder USER3) over the network 2 (136). The communication 152 can be one way from the dispatch operator 102 to the talkgroups A and B or two-way between the dispatch operator 102 and the talkgroups A and B depending on the selected communication method.

For some incidents it is necessary for the dispatch operator 102 to communicate with one set of resources separately from another set of resources, even though all resources are assigned to the same incident. This can be accomplished, for instance, by the dispatch operator 102 selecting one set of resources and selecting a communication method that puts those resources into a specific incident group (e.g., MSEL 1 or PATCH 1 group), and selecting another set of resources and a corresponding communication method that puts the other set of resources into a different incident group (e.g., MSEL 2 or PATCH 2 group). Such an arrangement can be used, for example, to put all fire resources on MSEL 1, and all traffic officers on PATCH 2. This in effect allows the dispatch operator 102 to create more then one incident group for a particular incident. In the above example, "all resources assigned to fire group 1" and "all resources assigned to traffic group 1" can be added to the list of choices, in the Resources window, for resource selection prior to selecting a communication method; or the communication method itself can imply the grouping such as "APB transmit to all resources assigned to fire group 1".

The function 148 monitors (210) via a signal or message 150 from the communication system 130 and/or via the CAD system 108 any changes that occur during the course of the incident or event that may have an impact on the actionable communication resource. Generally, such changes can include, but are not limited to, receiving from the resource management system a modification to the plurality of resource identifiers, and modifying the actionable communication resource based on this change; or detecting that a particular communication group in the set no longer includes any communication devices associated with resources in the resource list affiliated with this communication group, and, thereby, removing this communication group from the set of communication groups used to form the actionable communication resource; or detecting that one of the assigned resources has changed to a different communication device, and, based on this change, modifying the set of communication groups used to form the actionable communication resource; or detecting a change of the affiliated communication group for a communication device associated with one of the assigned resources, and, based on that change, modifying the set of communication groups used to form the actionable communication resource; or detecting an input from the operator of the resource management system (e.g., a change in the selected communication method), and, accordingly, changing (212) the actionable communication resource.

More specific changes might include, for example: changes to responder status (assigned, de-assigned from an incident, etc.); changes to responder's communication devices (such as changes regarding availability of those devices or regarding affiliated communication groups for those devices); changes to communication groups based on the number of assigned (and unassigned) responders to the incident in those communication groups. As a result of any of these changes, the CAD system 108 and the function 148 make necessary adjustments to the list of responders assigned to the incident, to the list of associated communication devices, and to the set of affiliated communication groups, which determines the changes made to the actionable communication resource.

Likewise, the present teachings are applicable when new resources are added to support the incident or event. For example, the CAD dispatch operator 102 can select, via the Resources window provided at the CAD workstation 104, new resources to be assigned to the incident, and may further select an appropriate communication method for these new resources (or may keep the same communication method for all assigned resources). Then the CAD system 108 determines for each resource, the underlying responders. The function 148 determines for each assigned responder an associated communication device and the communication groups to which these devices are currently affiliated. Finally, the communication system 130 enables the selected communication method (under the direction of the actionable communication resource) so that the dispatch operator 102 can provide media communication to those newly assigned responders.

The dispatch operator 102 may wish to send a voice communication to all the responders (both initial and new) assigned to the incident. There are several different options that can be provided to the dispatch operator to accomplish this. In a first option, the dispatch operator 102 may decide (while the new responders are still selected from the example above) to choose a second communication method to add those new responders to an Incident Patch Group (which includes the rest of the responders who were previously assigned to the incident) and initiate a Patch Transmit to that entire Incident Patch group. In a second option, the dispatch operator 102 can select "all resources assigned to same incident" before selecting a "communication method". This will allow the dispatch operator to initiate an APB Transmit to all responders assigned to same incident; or if the dispatch operator 102 selected Patch, will allow the dispatch operator to initiate a Patch Transmit to all responders assigned to the same Incident. A third option is to combine these two selection steps into one step to allow the dispatch operator 102 to choose a communication method for all responders assigned to the incident such as "Patch Transmit to all responders assigned to incident", or to simply imply if there are no new resource selections, then selecting a communication method implies all resources previously assigned under that communication method.

The CAD system 108 maintains the list of resources and associated responders assigned to the Incident. Accordingly, The CAD system 108 keeps track of all the resources and associated responders assigned to the incident, and automatically adds new responders to the list of responders assigned to the incident. So at any time, when the dispatch operator 102 chooses a communication method to send a voice communication to either initial resources, additional resources, resources in a particular incident group, or all resources, the dispatch operator 102 is able to communicate with those underlying responders' devices.

As the emergency response to the incident enters into a final phase and/or as responders complete their assigned tasks, the responders may be removed or de-assigned from the incident. Moreover, as the CAD dispatch operator 102 (or responders) update responder status as "available" indicating that they are no longer assigned to the incident, the CAD system 108 (or with the aid of an outside system) can keep track of all the responders associated with each communication group, and when the last responder in a communication group is de-assigned from the incident, the function 148 can either automatically remove that communication group from the set of communication groups used to form the actionable communication resource, or the CAD system 108 can first query the dispatch operator 102 whether she would like to remove that communication group from the set. This choice may be important and depends, for instance, on agency or dispatch operations. This choice may impact an Incident Patch group (which is actively working) or an MSEL group (for future APB or other types of Transmissions using the MSEL group) and is beneficial should the dispatch operator 102 want to remove those communication groups when responders are no longer working on the incident, slowly pruning down the media transmissions to only those communication groups containing active assigned responders on that incident.

Another aspect of the present disclosure is tracking other types of changes that impact communication groups assigned to the incident, for example, if any of the responders assigned to the incident change their voice enabled devices to a different communication group (for example, a different talkgroup, conventional channel, or broadband talkgroup, etc.). The function 148 keeps track of the list of associated communication groups assigned to the incident and can adjust that list to include any corresponding new communication groups (and examine a current communication group to see if any responders remain in that group, in case that was the last responder assigned to the incident to leave that communication group). The function 148 can also query the dispatch operator via the CAD system 108 before adding or removing a communication group, or do it automatically depending on agency or dispatch policy. Therefore, the next time the dispatch operator 102 initiates a communication method to "all responders assigned to the incident", the function 148 uses an updated set of communication groups for that incident, i.e., function 148 makes sure that the new communication group is included when initiating the selected communication method(s) for that incident (and removes any communication groups that no longer contain responders assigned to the incident).

Regarding whether to keep a particular communication group in the set, the function 148 may consider unassigned resources in the calculation of whether to include or exclude a particular communication group in the list of communication groups assigned to the incident. For example, the function 148 may decide to keep a communication group assigned to the incident even after all the assigned resources have left the communication group, in case the remaining unassigned resources are still working on the incident. Or the function 148 may take into account the location or current assignments of the remaining resources (e.g., too far away, clearly working on something else, etc.) and assume they are not working on the incident, and remove the communication group when all the assigned resources have left the communication group. The CAD system 108 could also display the list of assigned and unassigned resources for each talkgroup and allow the dispatch operator 102 to choose whether to remove or add a communication group.

In yet another illustrative implementation, a dispatcher utilizes a CAD application to initiate a BOLO procedure. In essence this procedure automatically sets in a motion a process where initially all users within a geographic area are alerted via a message to Be On the LookOut (BOLO) for a suspect. As time goes by and the suspect is not apprehended, the BOLO message can automatically be sent to all users within a larger geographic area.

Accordingly, CAD dispatcher 102 may wish to communicate with all of the recipients of the BOLO message as determined the CAD system 108. Using the present teachings, the CAD system 108 generates a CAD resource list of CAD identifiers corresponding to the BOLO recipients, and using the above-described techniques, the actionable communication resource function 148 receives these responder identifiers as input and outputs to the communication system 130 the actionable communication resource and the identified set of communication groups to which the recipients' devices are affiliated, so that the BOLO message can be sent to the recipients via the communications groups in the set.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for forming an actionable communication resource described herein. The non-processor circuits may include, but are not limited to, a radio receiver, a radio transmitter, signal drivers, clock circuits, power source circuits, and user input devices. As such, these functions may be interpreted as steps of a method to perform forming an actionable communication resource, described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for forming a group in a communication system, the method comprising:
    a group forming function, performing:
    receiving, from a resource management system, a plurality of user identifiers that identify a plurality of user wherein each user is associated with a communication device addressable by a communication system using a communication device identifier;
    for each resource identifier, determining the communication device identifier for the associated communication device;
    for each communication device identifier, identifying a communication group to which the corresponding communication device is affiliated, and using the identified communication groups to form a group of communication groups, addressable by the communication system.

2. The method of claim 1, wherein the group of communication groups is formed based on an input of a selected communication method.

3. The method of claim 2, wherein the group forming function comprises one or more of a Conference Bridge, Communication Bridge, Audio Bridge, Console Patch, a Communication Channel Patch, a Communication Group Patch, or a multiselect group.

4. The method of claim 2, wherein the communication method is selected by at least one of: the resource management system or an operator of the resource management system.

5. The method of claim 1, wherein the group of communication groups is formed from the set of communication groups to facilitate communications with the communication devices over a two-way land mobile radio communication system.

6. The method of claim 1, wherein the group of communication groups is used by an operator of the resource management system to communicate with the communication devices over the communication system using the addressable communication groups.

7. The method of claim 1, wherein determining the communication group comprises determining a talkgroup to which the corresponding communication device is affiliated.

8. The method of claim 1, wherein determining the communication group comprises determining a communication channel to which the corresponding communication device is affiliated.

9. The method of claim 1, wherein determining the set of communication groups comprises combining the identified communication groups with at least one other communication group based on policy.

10. The method of claim 1, wherein determining the set of communication groups comprises excluding at least one of the identified communication groups from the set of communication groups based on policy.

11. The method of claim 1 further comprising changing the group of communication groups based on input from an operator of the resource management system.

12. The method of claim 1, wherein the plurality of user identifiers comprise a plurality of Computer Aided Dispatch identifiers.

13. The method of claim 1 further comprising:
    receiving, from the resource management system, a modification to the plurality of user identifiers; and
    modifying the group of communication groups based on the modification to the plurality of user identifiers.

14. The method of claim 13, wherein modifying the group of communication groups comprises:
    detecting that none of the users in the plurality of users has an associated communication device that has an affiliation with a communication group currently included in the set of communication groups; and
    removing the first communication group from the set of communication groups used to form the group of communication groups.

15. The method of claim 1 further comprising:
    detecting a change to a different associated communication device for one of the users in the plurality of users; and
    modifying the group of communication groups, based on the change to the different associated communication device.

16. The method of claim 1 further comprising:
   detecting a change to an affiliated communication group for one of the communication devices; and
   modifying the group of communication groups, based on the change to the affiliated communication group.

17. A system for forming a group of communication groups in a communication system, the system comprising:
   an interface, memory, and processing device operably coupled to:
   receive, from a resource management system, a plurality of user IDs that identify a plurality of users, wherein each user is associated with a communication device addressable by a communication system using a communication device identifier;
   for each resource identifier, determine the communication device identifier for the associated communication device;
   for each communication device identifier, identify a communication group to which the corresponding communication device is affiliated, ;
   forming a communication group by combining communication groups from the set of communication groups to facilitate communications with the communication devices over the communication system.

18. The system of claim 17, wherein the resource management system comprises a Computer Aided Dispatch system.

19. The system of claim 17, wherein the communication system is a two-way land mobile radio system.

20. A non-transient computer-readable storage element having computer readable code stored thereon for programming a computer to perform a method for forming a communication group out of communication groups in a communication system, the method comprising:
   receiving, from a resource management system, a plurality of user IDs that identify a plurality of users, wherein each user is associated with a communication device addressable by a communication system using a communication device identifier;
   for each user identifier, determining the communication device identifier for the associated communication device;
   for each communication device identifier, identifying a communication group to which the corresponding communication device is affiliated;
   forming the communication group by combining communication groups from the set of communication groups, wherein the group of groups is used by an operator of the resource management system to communicate with the communication devices over the communication system.

* * * * *